US008086525B2

(12) United States Patent
Atwood et al.

(10) Patent No.: US 8,086,525 B2
(45) Date of Patent: Dec. 27, 2011

(54) METHODS AND SYSTEMS FOR PROVIDING RISK RATINGS FOR USE IN PERSON-TO-PERSON TRANSACTIONS

(75) Inventors: Christopher Colin Puckett Atwood, Cumming, GA (US); Deirdre Alexander McClure, Atlanta, GA (US); Benny Chi Hwo Pang, Atlanta, GA (US)

(73) Assignee: Equifax, Inc., Atlanta, GA (US)

( * ) Notice: Subject to any disclaimer, the term of this patent is extended or adjusted under 35 U.S.C. 154(b) by 320 days.

(21) Appl. No.: 12/262,553

(22) Filed: Oct. 31, 2008

(65) Prior Publication Data
US 2009/0125427 A1 May 14, 2009

Related U.S. Application Data
(60) Provisional application No. 60/984,015, filed on Oct. 31, 2007.

(51) Int. Cl.
*G06Q 40/00* (2006.01)
(52) U.S. Cl. .................. 705/38; 705/35; 705/39
(58) Field of Classification Search .................. 705/35, 705/38, 39
See application file for complete search history.

(56) References Cited

U.S. PATENT DOCUMENTS

| 6,785,661 | B1 | 8/2004 | Mandler et al. |
| 7,364,073 | B2 * | 4/2008 | Webb ............................ 235/384 |
| 2003/0018558 | A1 | 1/2003 | Heffner et al. |
| 2003/0139990 | A1 | 7/2003 | Greco |
| 2003/0212618 | A1 | 11/2003 | Keyes et al. |
| 2004/0210527 | A1 | 10/2004 | Woda et al. |
| 2004/0245330 | A1 | 12/2004 | Swift et al. |
| 2005/0065872 | A1 | 3/2005 | Moebs et al. |
| 2005/0119961 | A1 | 6/2005 | Tanzillo et al. |
| 2006/0074793 | A1 * | 4/2006 | Hibbert et al. ................... 705/38 |
| 2006/0226216 | A1 | 10/2006 | Keithley et al. |
| 2006/0293981 | A1 | 12/2006 | McNelley et al. |
| 2007/0226130 | A1 * | 9/2007 | Haggerty et al. ............... 705/38 |

FOREIGN PATENT DOCUMENTS

| WO | WO-2006002358 A2 | 1/2006 |
| WO | WO-2006080914 A1 | 8/2006 |

OTHER PUBLICATIONS

Transunion® 'TransUnion's Smart Move Provides Independent Rental Owners With New Level of Risk Insight,' 2 pages, Sep. 16, 2008 http://newsroom.transunion.com/index.php?s=43&item=487, 2 pages, Sep. 16, 2008.
Transunion® / SmartMove Click.Check.Rent. http://www.mysmartmove.com/, 1 page, Sep. 16, 2008.
International Search Report and Written Opinion mailed Apr. 5, 2009 in related International Application No. PCT/US2008/081968.

* cited by examiner

*Primary Examiner* — Lindsay M Maguire
*Assistant Examiner* — Hao Fu
(74) *Attorney, Agent, or Firm* — Kilpatrick Townsend & Stockton LLP

(57) ABSTRACT

Embodiments of the present invention provide a system for determining a risk rating associated with a subject to support a person-to-person transaction. The system includes a profile device in communication with a database that includes personal information and history information associated with the subject. The profile device includes a profile engine stored on a computer-readable medium. The profile engine can access the personal information to authenticate the subject and access the history information to generate a risk rating for the subject. The risk rating is generated by scoring the history information using pre-set criteria. The profile engine can output the risk rating to a reviewer identified by the subject.

18 Claims, 14 Drawing Sheets

▲ Welcome John Smith | Logout     Contact Us | Site Map | Quick Search | SEARCH ▲

United States    Products   Learning Center   Customer Service   Online Dispute     Member Center

Identity Report

| Credit Watch ▢ | Score Watch ▢ | Credit Report ▢ | Credit Score ▢ | Identity Report ▢ | Manage My Account ▼ |

Important Messages

Your opinion matters. That's why we've been listening carefully – making changes to the Member Center to better benefit you. See for yourself! You'll discover simpler navigation, enhanced Credit Score and Credit Report summaries and easy-to-customize alerts. Check out our Member Center Quick User Guide.

Partner Message

Some partner message will be displayed here. This is a global portlet that appears on all tabs and has partner specific message

Identify Report created on 01/01/2009 and available until 10/02/2009

Report on: John Smith

★★★★
300 - 599

Identity Verified     Credit Summary     Share Report

Identify Verified as of 01/01/2009

Your name and address have been authenticated against credible data sources. The street address and date of birth will not be shared with Reviewer.

John Joe Smith     Date of Birth
123 Main Street          02/13/1980
Atlanta, GA 30084

Also called
- J. Smith
- John Smith, Jr.

Other identify indicators

◯ Address locations    ◯ Address usage

◯ Social Security Number    ◯ Office of Foreign Assets Control (OFAC) Database Screening

Report Manager

Update Report     Your Past Reports

Reports Available

| Credit Report | Unlimited | ? | Get a New Report |
| 3-in-1 Credit Report | 1 of 1 | ? | Get a New Report |
| Score Power | Discounted | ? | Order Now |

Figure 6a

Credit Summary as of 01/01/2009

The following is a summary of your credit history based on data from your Credit Report. The Potential Negative Factors are for your information and are not available to Reviewers.

FICO Credit Score Card

| Bad | Not Good | Good | Very Good | Great |
|---|---|---|---|---|
| ★★★ | ★★★★ | ★★★★ | ★★★★ | ★★★★★ |
| 300 - 599 | 560 - 659 | 660 - 724 | 725 - 759 | 760 - 850 |

Potential Negative Factors
- You have a public record and a serious delinquency on your credit report.
- You have multiple accounts showing missed payments or derogatory descriptions.
- Some text displayed here.

Want More Details?

This Identity Report data is only part of your credit profile. You can obtain a full credit report, with FICO score and detailed potential negative and positive factors with Score Power.       Learn More     Buy Score Power

Identify Report Mailbox

Your Mailbox allows you to view, request and share Identity Report.

Viewing and sharing the Identity Report is subject to additional product terms.

[ Inbox ] [ Outbox ] [ Request A Report ]           Share Report

Enter a Report ID number to claim a report. [         ] [ Claim Report ]

You have 10 report(s) that have been shared with you:

| ☐ Name | Email | Viewed? | Expires | Report | Memo |
|---|---|---|---|---|---|
| ☑ John Doe | john@credit.com | Yes | 02/05/2009 | A12D3E31TY | 🗑 |
| ☐ John Doe | john@credit.com | No | 01/23/2009 | A12D3E31TY | 🗑 |
| ☐ John Doe | john@credit.com | No | 03/01/2009 | A12D3E31TY | 🗑 |
| ☐ John Doe | john@credit.com | Yes | 01/02/2009 | A12D3E31TY | 🗑 |
| ☐ John Doe | john@credit.com | No | 05/09/2009 | A12D3E31TY | 🗑 |

[ Delete ]

Contact Us

Product Questions?
Call 1-800-55-GUARD (1-800-000-000) 24 hours a day, 7 days a week or email questions to:
Customer Care

Suspect Fraud?
Place a free 90-day fraud alert on your credit file if you believe you could be a victim of fraud. Place your alert online or call 1-800-555-5555.
Learn more

Credit Report Disputes
Need to correct an error in your credit report?
Dispute items in your credit report

Opt out of Promotional Offers at:
www.optoutprescreen.com

Figure 6b

Identify Report Mailbox – John Smith

Your Mailbox allows you to view, request and share Identity Report.

Viewing and sharing the Identity Report is subject to additional product terms.

| Inbox | Outbox | Request A Report |

Share Report

Enter a Report ID number to claim a report.

[ ] Claim Report

You have 10 report(s) that have been shared with you:

| Name ▲ | Email ▶ | Received ▶ | Expires ▶ | Report ▶ | Memo |
|---|---|---|---|---|---|
| John Doe | john@credit.com | 02/04/2009 | 02/05/2009 | A12D3E31TY | 📄 |
| John Doe | john@credit.com | 01/22/2009 | 01/23/2009 | A12D3E31TY | 📄 |
| John Doe | john@credit.com | 02/28/2009 | 03/01/2009 | A12D3E31TY | 📄 |
| John Doe | john@credit.com | 01/01/2009 | 01/02/2009 | A12D3E31TY | 📄 |
| John Doe | john@credit.com | 05/08/2009 | 05/09/2009 | A12D3E31TY | 📄 |

Figure 8

Mary Jones  Close ☒

Identity Report

John Smith
Report # 110033445
Created on 01/01/2009 and viewable until 01/15/2009

Identity Verified as of 01/01/2009

The Subject's name and address have been authenticated against credible data sources. The results are presented here.

✓ John Smith  Age Range:
Atlanta, GA 30038  25 - 29

Also Called

Other Identity Indicators

| ⊚ Address locations | ⊚ | ⊚ Address usage | ⊚ |
|---|---|---|---|
| ⊚ Social Security Number | ⊚ | ⊚ Office of Foreign Assets Control (OFAC) Database Screening | ⊚ |

Credit Summary as of 01/01/02009

The following is a summarizes of the Subject's credit history as verified.

FICO Score Card

| Bad ▲ | Not Good | Good | Very Good | Great |
|---|---|---|---|---|
| ★★★★★ 300 - 599 | ★★★★★ 560 - 659 | ★★★★★ 660 - 724 | ★★★★★ 725 - 759 | ★★★★★ 760 - 850 |

Additional Details

Other aliases used.

Figure 10

METHODS AND SYSTEMS FOR PROVIDING RISK RATINGS FOR USE IN PERSON-TO-PERSON TRANSACTIONS

CROSS-REFERENCE TO RELATED APPLICATIONS

This application claims priority to U.S. Provisional Patent Application No. 60/984,015, filed Oct. 31, 2007 and entitled "Methods and Systems for Providing Risk Ratings for Use in Person-to-Person Transactions," the entirety of which is hereby incorporated by reference.

FIELD OF THE DISCLOSURE

The present disclosure relates generally to providing a risk rating for use in a person-to-person transaction, and specifically for determining, and providing access to, the risk rating over a network.

BACKGROUND

Transactions can occur when various types of people or groups exchange goods, services, property, time, or money with each other. A transaction can occur when a person selects a good or service from a business and gives the business money or another form of payment in exchange for the good or service. Examples include services or goods provided to a consumer by a realtor or other independent contractor in exchange for money. A transaction can also occur between consumers—persons that are not associated with a business. For example, one consumer might sell or rent his or her home to another consumer or obtain services such as childcare, real estate agent representation, and home improvements, from another consumer.

Increasingly, consumers exchange goods and services with other consumers over the Internet or another network. A seller might list information associated with a good or service he or she wishes to sell on an Internet web site. A potential buyer can review the information and contact the seller via the Internet or offline to arrange the purchase of the good or service. Some Internet web sites require the buyer to submit payment for the good or service to the web site provider. The website provider, after verifying acceptable payment, instructs the seller to send the good or provide the service to the buyer.

Buyers and sellers entering these types of transactions, both online and offline, do not personally know each other typically and, thus, experience a certain level of risk that one of the parties will not or cannot perform the obligations he or she promises during the transaction. For example, a buyer might represent that he or she has the necessary financial resources to complete a transaction, causing the seller to remove goods or services from a listing service in anticipation of selling them to the buyer, even when the buyer does not have such resources. A potential buyer might indicate an interest in a seller's house that causes the seller to take time to arrange a showing of the seller's house to the potential buyer when, in fact, the potential buyer does not have the financial resources to purchase the seller's house. Sellers of services such as childcare may have a track record of failing to adequately perform the service or have a criminal or otherwise questionable background that would cause the buyer of the services to select a different service provider. Sellers of goods could have a history of failing to provide the goods to the buyers after receiving payment for the goods.

Such information may be unavailable to a party involved with a transaction. Without such information, buyers and sellers are assuming a certain level of risk. Some transaction systems provide information about a seller's past performance with other buyers using the system. For example, Amazon's® seller rating system allows buyers who have purchased goods from the seller to rate and post comments about the seller's performance during the transaction. Potential buyers can review the ratings and feedback in determining whether to enter a transaction with the buyer. Such systems, however, do not provide a rating system based on objective data such as credit score, criminal record, employment history, and/or income history that can help the party to determine the risk associated with entering a transaction with the other party.

A system and method is desirable in which a risk rating associated with a subject can be determined. A system and method is also desirable that can provide the risk rating to a party contemplating entering into a transaction with the individual associated with the risk rating. A system and method is also desirable for providing a transaction guarantee that includes a certain level of insurance that would compensate the other party involved in the transaction if the individual for whom the risk rating is determined fails to perform his or her obligations under the transaction.

SUMMARY

In an embodiment, a system for determining a risk rating associated with a subject to support a person-to-person transaction is provided. The system includes a profile device in communication with a database that includes personal information and history information associated with the subject. The profile device includes a profile engine stored on a computer-readable medium. The profile engine can access the personal information to authenticate the subject and access the history information to generate a risk rating for the subject. The risk rating is generated by scoring the history information using pre-set criteria. The profile engine can output the risk rating to a reviewer identified by the subject.

This illustrative embodiment is mentioned not to limit or define the invention, but to provide examples to aid understanding. Other aspects, advantages, and features of the present invention will become apparent after review of the entire application, including the following sections: Brief Description of the Drawings, Detailed Description, and Claims.

BRIEF DESCRIPTION OF THE DRAWINGS

FIGS. 6a-6b are a screen shot of a user interface for reviewing a risk rating by a subject according to one embodiment of the present invention.

FIG. 8 is a screen shot mailbox for a subject according to one embodiment of the present invention.

FIG. 10 is a screen shot of an interface for a reviewer to access a risk rating of a subject according to one embodiment of the present invention.

DETAILED DESCRIPTION

Figure 1:
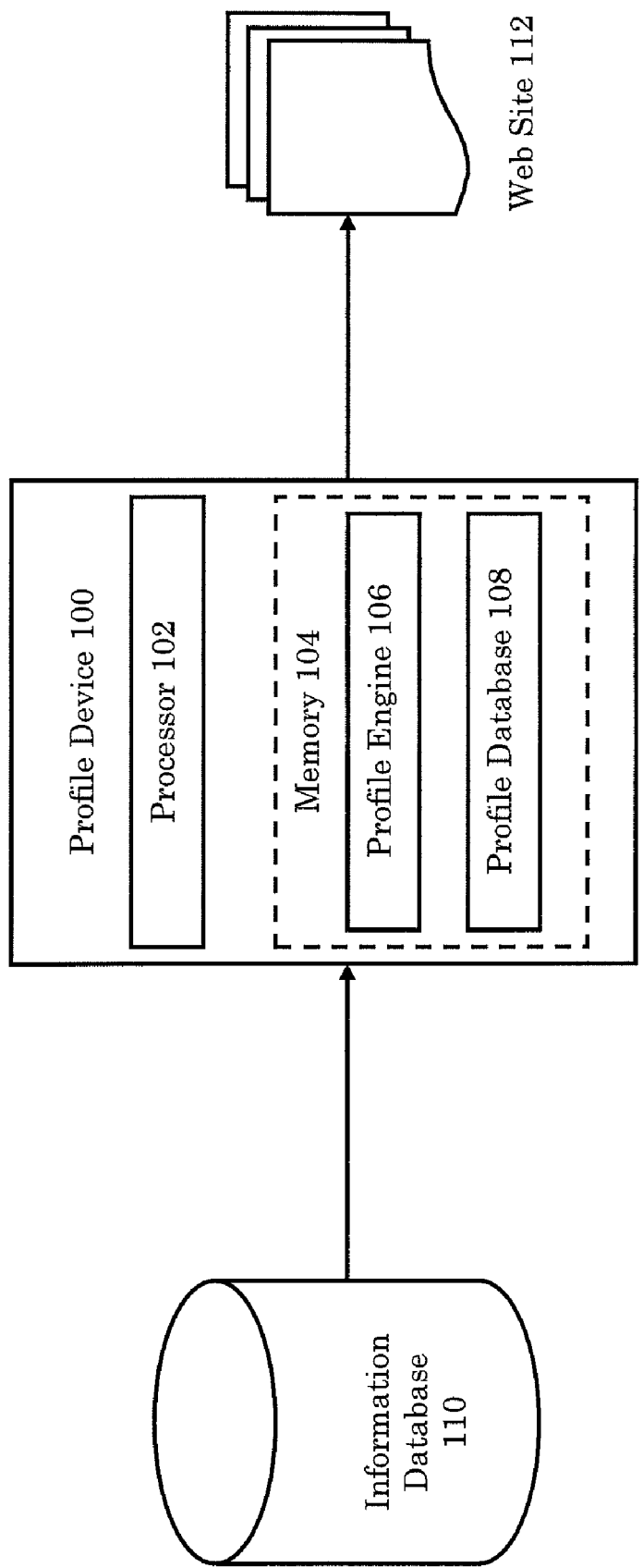
FIG. 1 shows a system used to determine a risk rating associated with a subject and to provide the risk rating to a reviewer according to one embodiment of the present invention.

Throughout the description, for the purposes of explanation, numerous specific details are set forth in order to provide a thorough understanding of certain aspects and embodiments of the present invention. It will be apparent, however, to one skilled in the art that the disclosed aspects and embodiments may be practiced without some of these specific details. In other instances, well-known structures and devices are shown in block diagram form to avoid obscuring the underlying principles of the disclosed aspects and embodiments.

Aspects and embodiments of the present invention relate to methods and systems for providing a risk rating to buyers and/or sellers in a person-to-person transaction. A reviewer that is a party to a transaction or a potential transaction can receive some level of knowledge of the risk associated with a subject with which they are negotiating to enter into a transaction. A "subject" as used herein can include any person or organization that provides permission for a reviewer to access risk rating associated with the subject. A "reviewer" as used herein can include any person or organization that may access the risk rating of the subject.

A transaction can include the exchange of goods, services, property, money, any combination thereof, or social agreements, such as dating. In some embodiments of the present invention, a profile database is developed that includes risk rating profiles of subjects, each including a risk rating for a subject based on information associated with the subject. Risk ratings may include an indicator that provides a reviewer with a relative indication of risk associated with doing business with the subject. The risk rating may be developed in real time based on information, such as information from one or more databases.

Each risk rating profile can be developed after the subject elects to set up their profile. A profile engine, in communication with a profile database, receives personal information and/or business information from the subject. The personal and/or business information can be received over a network such as the Internet, by telephone, email, or facsimile, or via regular mail. Personal information may include name, address, social security number, and date of birth. An example of business information includes feedback the subject has received regarding their business activities on a third-party website, such as eBay®.

The profile engine first authenticates the subject by accessing information from an information database and comparing the provided personal information to the information from the information database. After authenticating the subject, the profile engine utilizes the subject's social security number or other personal identification information to access one or more information databases and obtain history information regarding the subject. Examples of history information can include credit history or credit score, criminal history, employment history, identity verification and/or income history. Employment and income history may be a verification that the subject is currently employed, has an income, or has an income above a certain amount. In other embodiments, employment and income history include an income amount, a range of an amount in which income falls, current employer, past employer(s), or amount of time at a current job. The profile engine analyzes the history information and develops a risk rating, using pre-set criteria, based on the history information. Pre-set criteria may be statistical information indicating averages regarding all or a subset of a selected population for each of the history information categories.

The risk rating may include an indicator that indicates the transactional risk the subject poses based on the history information and the ease or difficulty with which the subject was authenticated. Examples of an indicator include a color-based system where red, yellow, and green represent high risk, medium risk, and low risk, respectively, or a number or letter system where different numbers or letters represent varying levels of risk. An overall risk rating can be developed based on all of the history information or a risk rating for each category of history information and the authentication step can be developed for the subject. In some embodiments, an overall risk rating includes an identification of a credit band in which the information associated with the subject falls and whether the particular credit band corresponds to a bad, average, good, or very good.

If the subject has no information for a category of history information, the risk rating may include data showing no information was available or provided. The profile engine may also allow the subject to review his or her own risk rating profile, including detailed information in addition to the risk rating, and submit corrections if the subject believes the information in the risk rating profile is inaccurate.

A reviewer interested in obtaining the risk rating can notify the subject of his or her wish to obtain the subject's risk rating. The subject can then notify the profile engine that the reviewer has permission to access the subject's risk rating. For example, the subject can fill out a form on a website by including the reviewer's name and contact information, such as an email address, and indicate that the reviewer has permission to view the subject's risk rating. The profile engine can send a notification to the reviewer providing a location where he or she can view the subject's risk rating and a PIN or passcode that must be entered before the risk rating can be viewed. The reviewer can access the risk rating at the location by inputting information that includes the PIN or passcode. In some embodiments, the PIN or passcode is a single use PIN or passcode, such that the risk rating may be accessed once after the reviewer receives permission to do so. A single use PIN or passcode may prevent others without permission from accessing the risk rating.

In some embodiments, the profile engine may issue a transaction guarantee to the reviewer for a proposed transaction between the reviewer and the subject. For example, the profile engine can receive proposed transaction information and issue a transaction guarantee up to a certain dollar amount that is based on the proposed transaction information and the subject's risk rating. The transaction guarantee may be valid for a limited amount of time, such as a pre-set amount of time after a date on which the transaction guarantee is granted or requested.

Certain aspects and embodiments of the present invention may be implemented via the Internet. In some embodiments, a website is generated to communicate with subjects and parties. Alternatively, methods and systems according to various embodiments of the present invention may be implemented as part of a website that includes various other functions.

Illustrative System Implementation

Various systems may be used to generate a risk rating and provide a reviewer with access to the risk rating. FIG. 1 illustrates one embodiment of a system that can be used to generate a risk rating for a subject. The system includes a profile device 100 that includes a processor 102 and a computer-readable medium such as memory 104. Examples of a profile device 100 include a computer and a server. Memory 104 can include computer-executable code, such as a profile engine 106, and stored data, such as profile database 108. As described in more detail below, the profile engine 106 can be executed by the processor 102 to perform various tasks in accordance with various embodiments of the present invention.

The profile engine 106 can authenticate a subject that wishes to obtain a risk rating using information obtained from an information database 110 before generating a profile for the subject. Once the subject is authenticated, the profile engine 106 generates a profile that includes a risk rating for the subject based on information from information database 110, such as history information, and stores the risk rating in the profile database 108. The profile engine 106 may be in communication with the information database 110 via a network such as a LAN, WAN, the Internet or similar networks, through software such as a database server application, or connected directly via serial, coaxial, or other similar cable connection. In some embodiments, the profile device 100 includes the information database 110. The information database 110 can include one database or multiple databases, where each database may be located in the same or different location as the other databases. In some embodiments, each database includes a different type of information.

Information database 110 can include various types of information regarding the subject, the subject's business history, or other information relevant to authenticating the subject or determining a risk rating for the subject. In some embodiments, information database 110 includes personal information about subjects and history information, such as history information associated with subjects' business and criminal history. The personal information may be supplied from an entity, such as a government agency, that performed some level of verification that the information stored in information database 110 is accurate. Examples of personal information that may be stored in information database 110 include name, social security number, current and past addresses, and date of birth. Examples of history information may include credit history or credit score, criminal history, employment history, income history, public records, bad check history, and telecommunications or other utilities payment history data, obtained from entities such as a credit bureau, government agency, or Talx Corporation.

In some embodiments, the profile device 100 may be in communication with additional databases that contain information about a subject. For example, a web site may allow people to provide information about a subject's business activities and the provided information can be associated with a subject based on personal information and stored in a database that is accessible to the profile device 100. An example of such information includes the subject's performance history on an online goods or services exchange website. Other examples of such information include comments by others who have been a party to an offline transaction (e.g. an exchange of goods or services not through the Internet) with the subject. The profile device 100 can also include an interface that allows users to manually enter data associated with one or more subjects and their business or criminal activities. For example, managers of the profile device 100 may receive data associated with a subject via regular mail or otherwise from an information source, and can enter and store the information into the profile device 100. The entered information can be stored in memory 104 and accessible to the profile engine 106.

The profile engine 106 determines a risk rating that includes an indicator showing the relative risk associated with a subject by comparing the subject's history information to pre-set criteria. Information database 110 may be updated continuously. The risk rating may be generated in real time based on information in the databases at any time. Once a risk rating is determined, the profile device 100 creates a profile associated with the subject and the risk rating and stores the profile in profile database 108. Upon receipt of permission from the subject to allow a reviewer to access the risk rating, the profile engine 106 makes at least the indicator available to the reviewer via a web site 112. The web site 112 may be a collection of web pages, one of which includes an indicator and an identification of the subject. In some embodiments, the profile engine 106 refreshes the risk rating after receiving a request for the risk rating by accessing the databases and updating the risk rating as needed.

Illustrative Methods for Determining a Risk Rating

Figure 2:
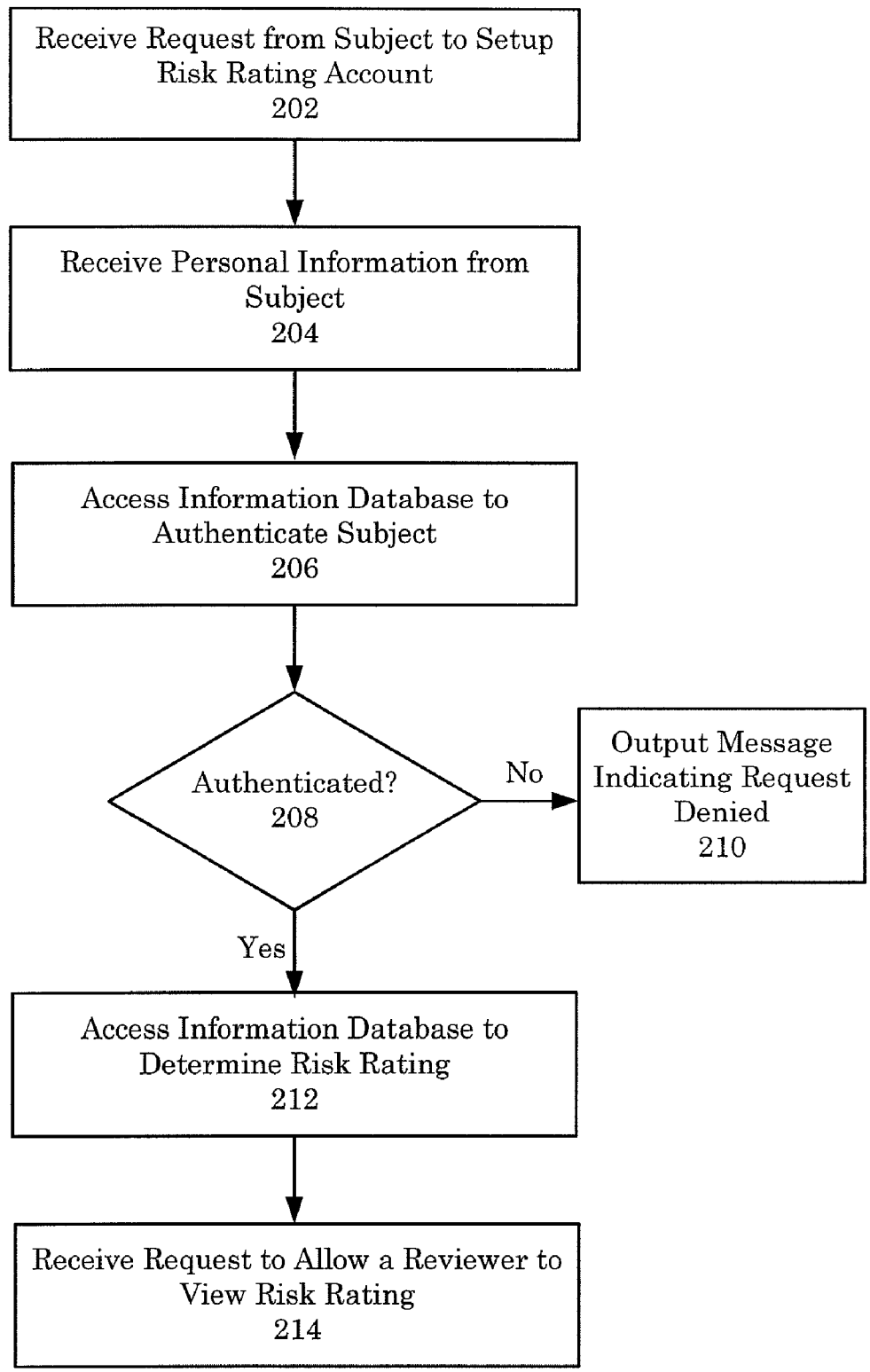
FIG. 2 shows a flow diagram for creating a risk rating account for a subject and determining a risk rating according to one embodiment of the present invention.
Figure 3:
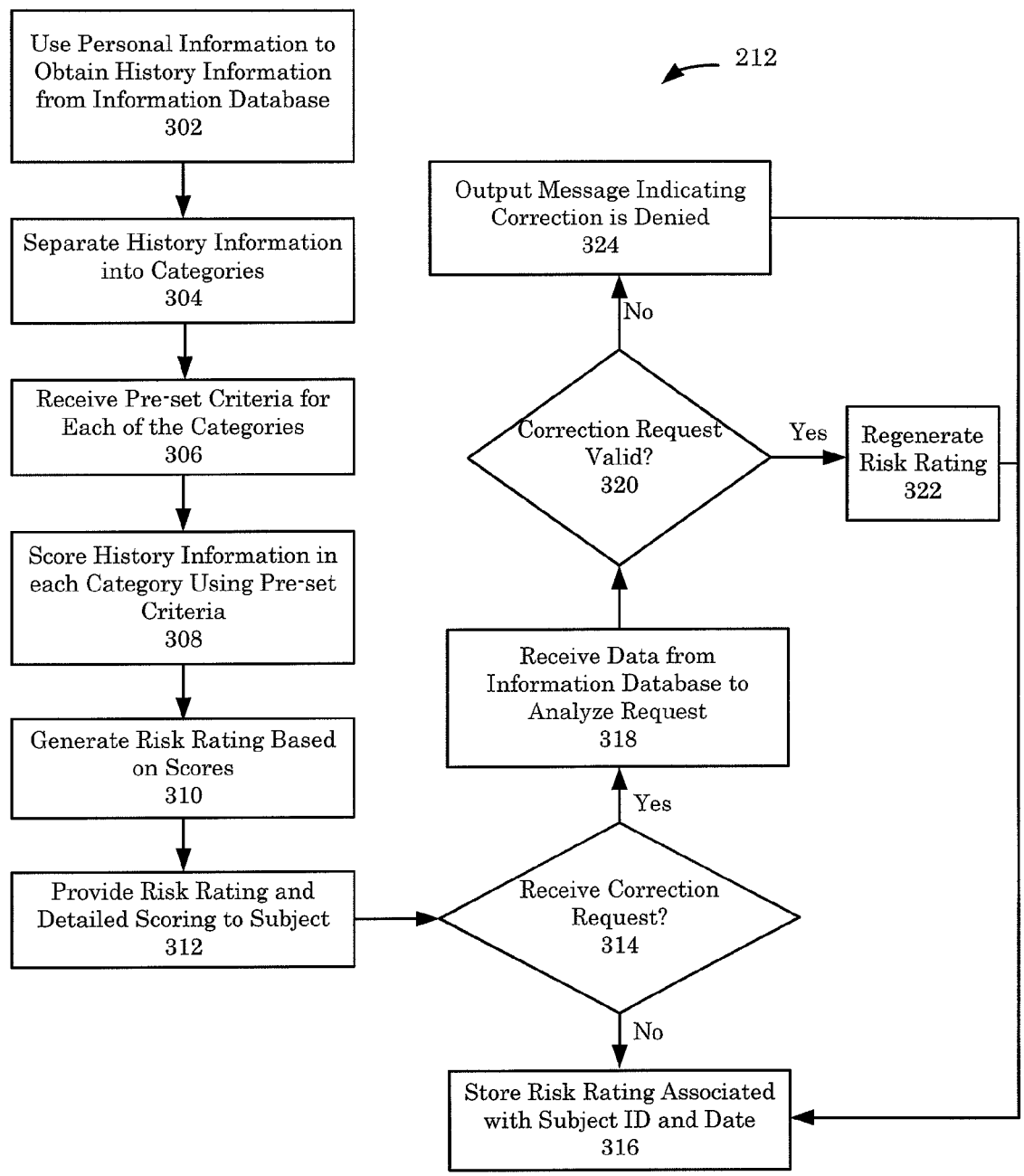
FIG. 3 shows a flow diagram for generating a risk rating for a subject according to one embodiment of the present invention.

Various methods can be used to determine a risk rating associated with a subject. FIGS. 2-4 illustrate some embodiments of methods for determining a risk rating and providing a reviewer with access to the risk rating. For purposes of illustration only, the elements of this method are described with reference to the system depicted in FIG. 1. Numerous other system implementations are also possible.

The method in FIG. 2 begins at block 202 when the profile device 100 receives a request from a subject to set up a risk rating account. The subject may initiate the request by accessing a web site that is associated with the profile device 100 and input the request that the subject wishes to create an account with a risk rating associated with the account. The profile device may be coupled to the web site, such as through a web server, and can receive and process the request. The subject can alternatively send the request via mail, facsimile, or any communication method to the entity that controls the profile device 100.

Along with the request, the profile device 100 also receives personal information from the subject in block 204. Personal information can include a user's name, address, social security number, and/or date of birth. The profile device 100 may also receive the personal information via a web site, mail, or any communication method. In some embodiments, the entity in control of the profile device 100 receives the request and personal information and enters the request and personal information into the profile device 100 using an interface such as a keyboard and/or mouse. The profile device 100 can store the request record and personal information into a temporary profile in memory 104.

In block 206, the profile engine 106 uses at least part of the personal information to access information database 110 and obtain data associated with the subject that is available from a data collection entity to authenticate the subject. Various methods may be used to authenticate the subject. For example, the profile engine 106 may request data, such as credit account information, from the information database 110 using the subject's social security number and send one or more questions to the subject regarding the subject's credit account information. The subject may be authenticated by answering the questions correctly. Another authentication method includes obtaining the same type of personal information data from the information database 110 as supplied by the subject and comparing them to determine if the user provided the correct information.

In block 208, the profile engine 106 determines if the subject was authenticated. If the profile engine 106 determines the subject was not properly authenticated, the profile device 100 outputs a message to the subject indicating that the request is denied in block 210. A message may be sent to the subject advising it that it does not possess the proper credentials to obtain a risk rating and the temporary profile may be changed to an inactive status or deleted. If the profile engine 106 determines the subject was properly authenticated, the profile engine 106 receives history information associated with the subject by accessing information database 110 and uses the history information to determine a risk rating for the subject in block 212. Once the risk rating is determined, the profile engine 106 can receive a communication from the subject providing permission for a reviewer to receive the risk rating in block 214.

FIG. 3 illustrates one embodiment of a method for accessing the information database 110 to receive history information and determine a risk rating for a subject. The method shown in FIG. 3 begins at block 302 when the profile device 100 accesses the information database 110 using at least part of the user's personal information to obtain history information associated with the subject. The history information can include information associated with the subject's past business transactions and criminal behavior that may be stored in the information database 110. For example, the data stored in information database 110 may be obtained from a credit bureau that includes data on a subject's credit score, credit history, employment history, and/or income history. The information database 110 may also receive and store data from government agencies, such as a police department, state or federal bureau of investigations, and state or federal courts, that includes a subject's public records history. The subject's public records history can include bad check history, telecommunication or other utility payment history, and criminal history. The profile engine 106 may associate the history information with the subject's profile and store the profile in profile database 108.

In block 304, the profile engine 106 separates received history information into one or more categories based on the type of history information received from the information database 110. The type of history information can depend on the content of the history information received. Types of history information can include credit history, public records, criminal history, and past business history. Each type of history information may be category in which the history is separated. Categories can include public records (including criminal history, bad check history, and/or telecommunications or other utility payment history), credit score, aspects of credit history (including credit limits, number of open credit accounts, and payment history), employment history, and income history. For any category in which no history information is received a "null" or another indicator may be placed in the respective category to indicate that no information was received.

In block 306, the profile engine 106 receives pre-set criteria for each of the categories. The pre-set criteria are data to which the subject's history information is compared. The pre-set criteria may have been previously provided to the profile device 100 and stored in memory 104. In some embodiments, the pre-set criteria may be obtained from a remote source to the profile device 100. The pre-set criteria, whether stored on the profile device 100 or accessed from a remote source, may be periodically or continuously updated. In some embodiments, the pre-set criteria are statistics regarding the types of information included in the history information calculated using data obtained from a selected number of people. For example, the pre-set criteria may be statistics concerning the relationship between certain types and numbers of credit payment delinquencies and the rate of which a subject fails to perform obligations he or she undertook. These statistics may be obtained from any source, for example the U.S. Census Bureau or a private statistics generating entity. In some embodiments, pre-set criteria may include thresholds with which to measure history information. For example, the pre-set criteria may include threshold levels of the number of times a subject has delinquent payments in their history information and assigns a rating to each threshold level. Other examples of pre-set criteria include average credit scores and statistics on the level of risk people who have committed various types of crimes pose.

In block 308, the profile engine 106 scores history information in each category using the pre-set criteria. The profile engine 106 compares the subject's history information in a category to pre-set criteria in the same category and generates a score for the subject's history information based on the comparison. For example, if the history information for the subject includes a relatively high yearly income, the score for that category may be higher than for a subject with relatively low yearly income. Similarly, the type of criminal history information of a subject may be considered and scored higher if it includes relatively few instances of low level crime (e.g. speeding ticket) than if it includes many instances of serious crimes (e.g. bribery, theft, larceny, etc.). The scores for each category can be collected by the profile engine 106. If the history information for the subject does not include any information for a category, a score indicating that no history information exists can be generated and collected. In some embodiments, the profile engine 106 sends a message to the subject indicating that no information exists for a category and requesting that the subject provide data (e.g. verifiable data) for certain categories of information. For example, the subject may provide verification of their employment and/or income status. The profile engine 106 may also collect other information associated with the subject that cannot be easily organized into the categories. In some embodiments, the profile engine 106 receives comments from individuals other than the subject who have been involved in transactions with the subject. The profile engine 106 can consider these comments, along with the scores, in generating a risk indicator associated with the subject.

In block 310, the profile engine 106 generates a risk rating based on the scores. In some embodiments, the profile engine 106 applies a weight to each score, averages the weighted scores and applies a risk rating to the overall average score based on averages obtained for a selected population of people. In other embodiments, the profile engine 106 applies a risk rating to each category of information. Each risk rating may be associated with the subject's profile and supplied to a reviewer that requests the risk rating. In some embodiments, the risk ratings are averaged to generate an overall risk rating for the subject. In generating the risk rating, the profile engine 106 may use the uncategorized information to add to or subtract from the overall risk rating depending on the substance of the uncategorized information and the trustworthiness of the source from which it came. For example, less emphasis may be placed on anonymous comments received from other individuals via web sites than from information from web site owners, such as eBay® or Amazon®, that the subject has a good or bad track record in meeting the obligations of web site users.

The risk rating may be represented by an indicator that corresponds to a scale showing the relative risk the subject poses based on the subject's history information and, in some embodiments, other information obtained regarding the subject. For example, a risk rating can be an indicator such as red, yellow, or green or the numbers 1-10, that corresponds to the relative risk a subject poses, where red or 1 indicates the subject poses a relatively high level of risk, yellow or 5 indicates the subject poses some risk, but there still exists a strong likelihood that the subject will perform his or her obligations, and green or 10 indicates that little, if any, of the subject's history information indicates that the subject would not perform his or her obligations. Indicators corresponding to 2-4 and 6-9 may provide a way to identify a subject's relative risk to a more granular level. Other examples of indicators include the numbers 1-100, a letter grade of A-F, and descriptive words such as "bad," "not good," "good," "very good," and "great." The profile engine 106 may also generate risk data regarding the subject and associate the risk data with the risk rating. Risk data can include specific descriptions of criminal history instances or identifications of categories for which the subject had little or no history information.

In some embodiments, the profile engine 106 can use history and/or personal information to determine credit capacity for a subject and provide an indicator that is indicative of the relative credit capacity. Credit capacity can include the relationship between income of a subject and their current debt. Credit capacity may be an estimate or an actual amount of additional credit a particular subject can afford based on his or her income. A reviewer can use the indicator of credit capacity to determine whether the subject can handle obligations under a particular transaction. In some embodiments, the profile engine 106 can determine an affordability for the subject using the history and/or personal information. Affordability may be a determination of the feasibility that the subject can afford a good or service under a transaction, and the level of risk associated with the determined affordability.

In block 312, the profile engine 106 may send the risk rating and a detailed scoring analysis, including risk data if any exists, to the subject to review for accuracy. In some embodiments, the profile engine 106 sends the risk rating to the subject, but not the detailed scoring analysis. The risk rating and/or detailed scoring may be provided to the subject via any communication method, examples of which include providing the data on a secure web site for a limited time and notifying the subject via email, telephone, or other communication method that the data is available for review. The risk rating and/or detailed scoring may be accessible using a PIN or passcode to provide greater security. The subject may access the risk rating and detailed scoring and review it for accuracy based on his or her own knowledge of his or her history information. In some embodiments, subjects do not receive the risk rating or a detailed scoring analysis before it is finalized.

In block 314, the profile engine 106 determines if a correction request is received from the subject. A correction request can include an identification of incorrect or out-of-date history information associated with the subject on which the risk rating was determined. For example, the subject may have been the victim of identity theft causing the history information to include activities performed by the thief using the subject's identity and resulting in a lower risk rating than the subject's true history information should indicate. In some embodiments, subjects may be given a limited amount of time in which to request corrections. If no correction requests are received, such as after a certain amount of time, the risk rating is associated with the identification of the subject and the date on which it was generated and stored in the profile database 108 in block 316. The risk rating can be associated with the subject by associating the risk rating to the profile of the subject.

If a correction request is received, the profile engine 106 receives data from the information database 110 to analyze the request in block 318. The data can include information associated with other individuals or data that is not explicitly associated with the subject, but is associated with the content that is in the request. In some embodiments, the data is information that has been provided to the information database 110 recently, such as after the profile engine 106 generated the risk rating.

In block 320, the profile engine 106 determines if the correction request is valid by analyzing the data from the information database 110 and comparing the history information on which the risk rating was generated. For example, the profile engine 106 may analyze the data and history information to determine if a discrepancy exists or another basis on which the correction may be valid. If the profile engine 106 determines that the correction request is valid, the profile engine 106 corrects the information and regenerates the risk rating for the subject in block 322. The regenerated risk rating can be associated with the subject identification and a date and stored in the profile database 108 in block 316. If the profile engine 106 determines the correction request is not valid, the profile engine 106 outputs a message to the subject indicating the correction is denied in block 324. The profile engine 106 can then store the risk rating with the subject identification and date in block 316

After the subject establishes a profile in the profile device 100, he or she may wish to utilize the risk rating when negotiating with a reviewer to enter into a transaction or otherwise conduct business for the exchange of goods and services. For example, the reviewer may request that the subject provide his or her risk rating to the reviewer or the subject may decide, without a request from the reviewer, to provide the risk rating. As stated above, the profile engine 106 can allow a reviewer to view the subject's risk rating by providing access to the subject's risk rating.

Figure 4A:
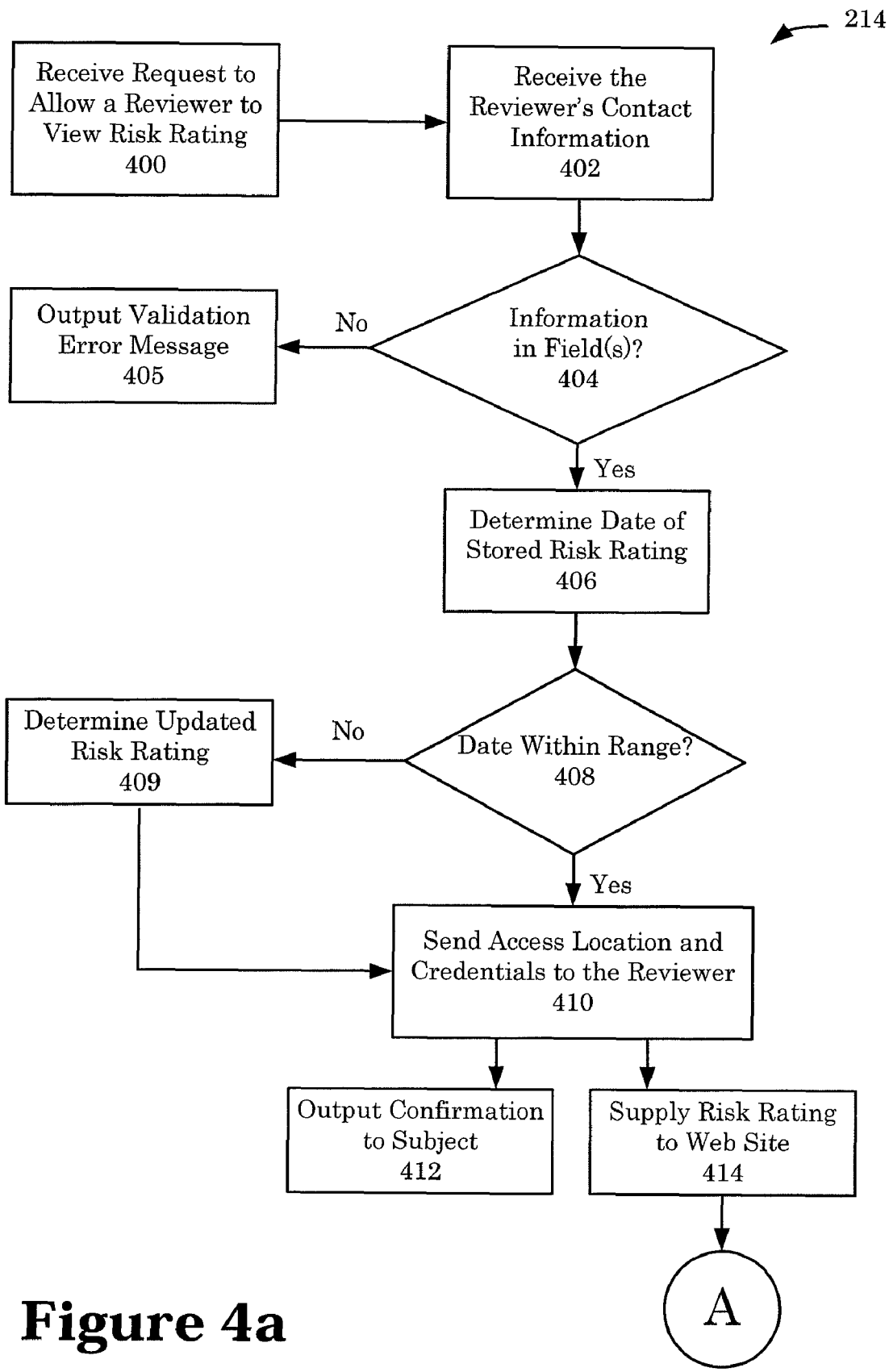
FIGS. 4a-4b show a flow diagram for receiving a request from a subject to provide a risk rating to a reviewer and providing the reviewer with access to the risk rating according to one embodiment of the present invention.
Figure 4B:
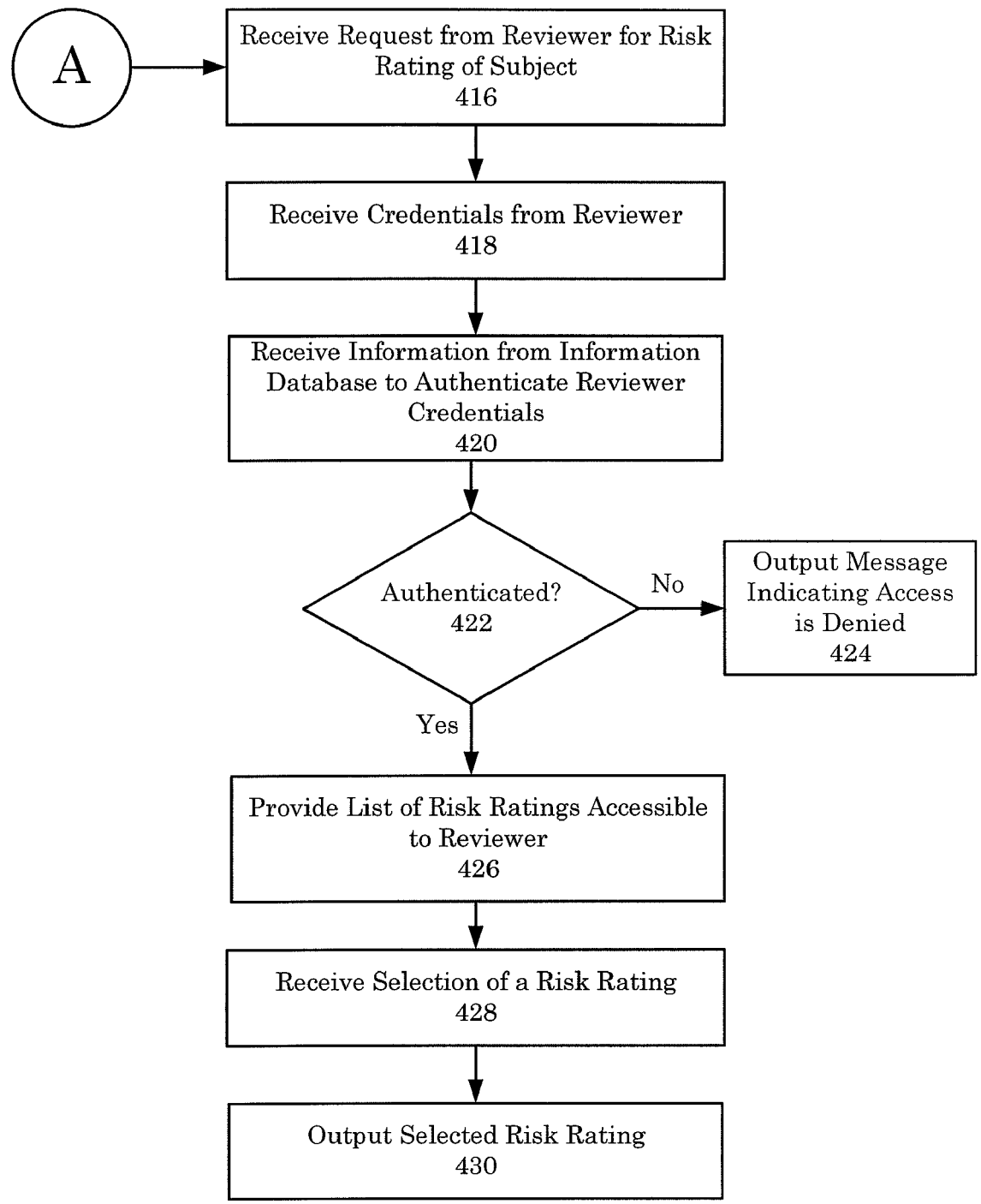

FIGS. 4a and 4b illustrate a method for providing a reviewer with access to a subject's risk rating after receiving permission from the subject according to one embodiment. The method begins in FIG. 4a at block 400 when the profile engine 106 receives a request from a subject to allow a reviewer to view a risk rating. The subject may access a web site associated with the profile device 100 and input a username or password to access a profile management web page on the web site. The profile management web page may include an option that the subject can select to provide a reviewer with access to the subject's risk rating. When the subject selects the option, a message may be sent to the profile engine 106, indicating that the subject has provided permission for a reviewer to access the risk rating associated with the subject.

In some embodiments, the subject can select parts of the risk rating to share with the reviewer and not other parts. For example, the subject may select to share an indicator of risk or data associated with the subject's credit history and identify verification, but not share information or risks associated with the subject's address, name, income, or employment history. The reviewer may receive the information the subject selected to share and a message indicating other types of information were not selected by the subject to share with the reviewer. For example, certain categories of information may be displayed to the reviewer as "not shared."

In block 402, the profile engine 106 receives contact information for the reviewer to whom the subject wishes to provide access to the risk rating. For example, the subject can utilize the web page used to select the permission option to input the contact information for the reviewer to which the subject wishes to provide access to the risk rating. Contact information for the reviewer can include a U.S. mailing address, email address, or telephone number. One or more fields, each requesting different information about the reviewer, may be provided on the website in which the subject can provide information. The reviewer information is received by the profile device 100 from the web site and associated with the subject's profile stored in memory 104.

In block 404, the profile engine 106 determines if information needed to provide access to the reviewer is received by, for example, determining if the information in fields requesting information from the subject is present in block 404. In some embodiments, the profile engine 106 determines if information is present in one or more fields that are used to identify and contact the reviewer. Examples of such fields include name and email address. The profile engine 106 may also analyze the information in each field to identify nonsensical or inaccurate information, or otherwise to validate the information in one or more of the fields.

If the information for contacting the reviewer is not present or otherwise not validated, the profile engine 106 outputs a validation error message to the subject indicating that the information is invalid or not present in block 405. The message can include an identification of the field where information needs to be corrected or added.

If the information for contacting the reviewer is present, or otherwise the information is included in the fields, the profile engine 106 determines the date on which the stored risk rating for the subject was determined in block 406. As new information associated with a subject is received and stored in the information database 110, the risk rating previously generated for the subject may become out of date. In block 408, the profile engine 106 determines if the date on which the risk rating of the subject was generated is within a pre-set time range with respect to the date the reviewer requests the risk rating. Examples of ranges include one day, two weeks, one month, and six months. Other ranges are possible.

If the date on which the risk rating was determined is outside the range, the profile engine 106 determines an updated risk rating in block 409. The updated risk rating can be determined by receiving history information from the information database and generating a risk rating for the subject in accordance, for example, with one or more of the processes described above.

If the date of the risk rating is within the pre-set range, or after a new risk rating is generated, the profile engine 106 provides access information to the reviewer by sending the location at which the risk rating can be accessed and access credentials to the reviewer in block 410. For example, the profile engine 106 can send access location and credentials to the reviewer via email over a network. The access location may be a URL that includes an address of the web site 112 from which the reviewer can obtain the risk rating. Access credentials may be a username, password, PIN, and/or passcode that the reviewer can use once they have accessed the web site 112 to obtain the risk rating. In some embodiments, the access credentials may be single use credentials, such that they expire after they are used or after a pre-set amount of time. The reviewer may be required to input the access credentials at the web site 112 before the risk rating is provided to the reviewer. The profile engine 106 may also send the reviewer instructions on how to access the web site 112 and risk rating.

In block 412, the profile engine 106 outputs a confirmation to the subject that the risk rating is available to the reviewer. For example, a confirmation message can be displayed on a web site for the subject. In block 414, the profile engine 106 supplies the risk rating to the web site 112, along with the same credentials supplied to the reviewer. Web site 112 may be one or more web pages stored on a web server (not shown). The web server receives the risk rating and access credentials from the profile engine 106 and creates a web page that includes the risk rating, along with an identification of the subject, that is accessible after the web server receives the appropriate credentials from a web user and for a limited period of time. The risk rating may be one or more of: (1) the indicator representing the risk rating; (2) the risk data; (3) detailed scoring information; (4) criminal history descriptions; (5) identification of categories for which no history information was available; (6) identification of categories for which limited history information was available; and (7) the real name of the subject. The web page may also include a scale with which the reviewer can determine the meaning of the indicator shown.

The process may continue in block 416, shown in FIG. 4b, when the profile engine receives a request from the reviewer for the risk rating of the subject. The request can include a selection of an option on a web page that corresponds to accessing a risk rating. The profile engine 106 receives credentials from the reviewer in block 418. The credentials can include an identification of the reviewer, such as the reviewer's email address, passcode, PIN, and/or other unique identifier.

The profile engine 106 receives information corresponding to the credentials from storage, such as the information database 110, to authenticate the reviewer credentials in block 420. For example, the profile engine 106 may compare the credentials supplied by the reviewer to stored credentials to determine if they match. In some embodiments, the reviewer is authenticated using credit or other types of history data associated with the reviewer.

The profile engine 106 determines if the reviewer is authenticated in block 422. A reviewer may be authenticated if the credentials supplied by the reviewer matches the credentials from the information database 110. Other authentication processes may be used. If the reviewer is not authenticated, the profile engine 106 outputs a message to the reviewer, at block 424, indicating that access to one or more risk ratings is denied.

If the reviewer is authenticated, the profile engine 106 provides a list of risk ratings accessible to the reviewer in block 426. For example, the profile engine 106 may display a list of subjects for whom risk ratings are available to the reviewer on a web page displayed to the reviewer over a network.

In block 428, the profile engine 106 receives a selection of a risk rating that the reviewer wishes to access and outputs the selected risk rating in block 430.

The reviewer can use the risk rating to decide whether to enter into a transaction with the subject. In some embodiments of the present invention, the reviewer may receive a request for feedback regarding whether the risk rating caused the reviewer to enter or decline to enter a transaction with the subject.

Illustrative Methods for Providing a Transaction Guarantee

Figure 5:
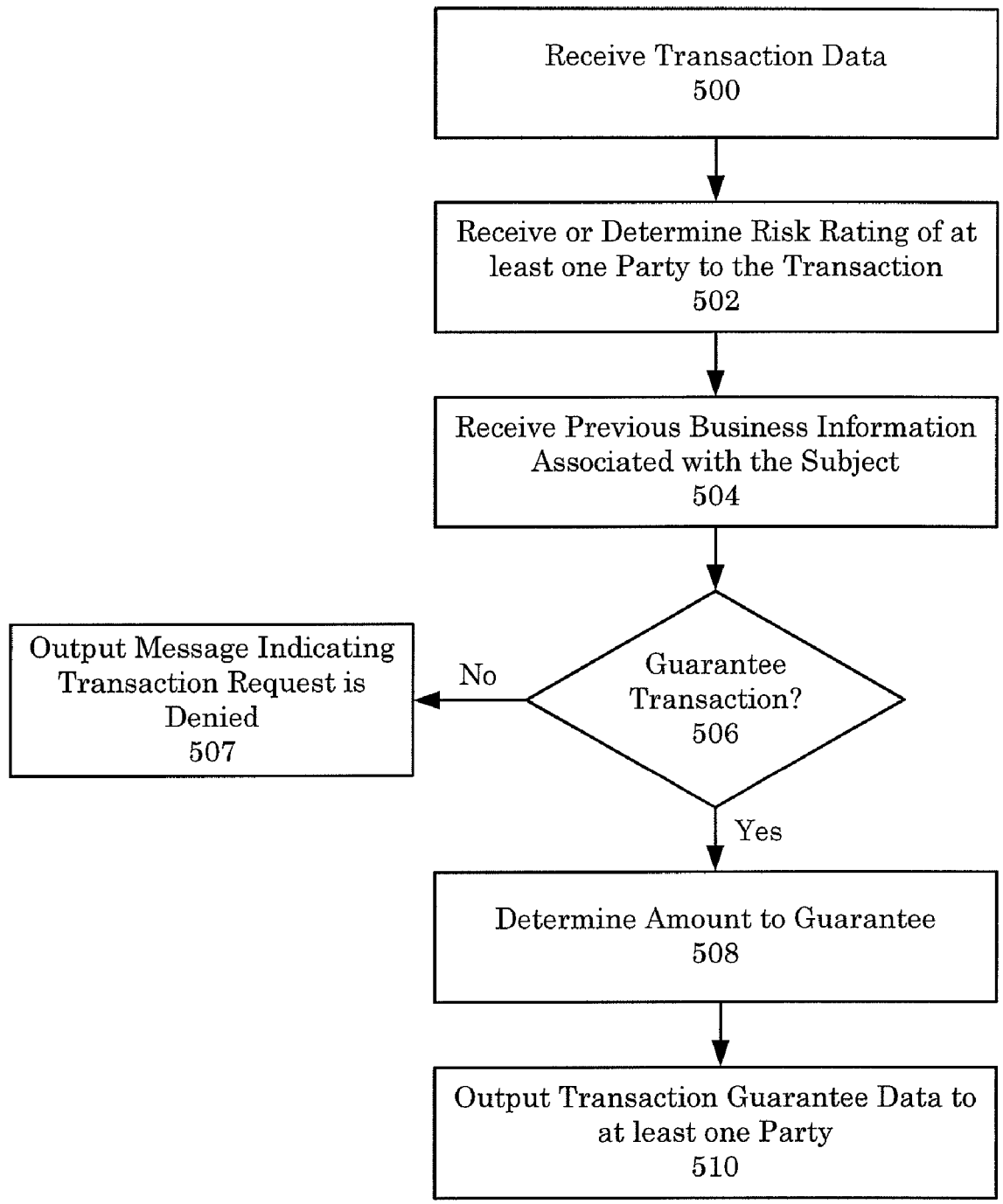
FIG. 5 is a flow diagram for determining a transaction guarantee for a transaction using a risk rating according to one embodiment of the present invention.

Embodiments of the present invention may also be used to determine and offer a transaction guarantee. A transaction guarantee may be a guarantee that the subject for whom the risk rating is determined will perform his or her obligations under the transaction and if the subject fails to perform, the reviewer can receive compensation up to a selected amount for the subject's failure. In some embodiments, the transaction guarantee is an amount up to a specified amount based on the risk rating of at least one subject. In other embodiments, the transaction guarantee is an amount that is determined based on a risk rating and information associated with a particular transaction. For example, the subject can obtain a risk rating and may be negotiating with a reviewer to enter into a transaction. The subject may proactively offer, or the reviewer may request, that the subject obtain a transaction guarantee for the transaction. FIG. 5 illustrates one method for providing a transaction guarantee in accordance with certain embodiments of the present invention. For purposes of illustration only, the elements of this method are described with reference to the system depicted in FIG. 1. A variety of other system implementations are also possible.

The method shown in FIG. 5 begins at block 500 when the profile engine 106 receives transaction data from one or both of the subject and the reviewer. Transaction data may be data regarding the terms and conditions of the proposed transaction that can include one or more of: (1) identification of the good(s) or service(s) that are the subject of the transaction; (2) the obligations of each party in the transaction; (3) the amount of money, if any, that will be exchanged under the transaction; (4) the performance deadline under the transaction; (5) the guarantee amount that the parties request; and (6) the timeframe during which the guarantee applies. Additional terms and conditions may be provided, depending on the nature of the transaction for which a guarantee is being sought. Transaction data may be sent to the profile engine 106 using any communication method, including via a network such as the Internet.

In block 502, the profile engine 106 accesses the profile database 108 and obtains a risk rating associated with the subject. If the risk rating is old—generated before a pre-set timeframe—the profile engine 106 may generate a new risk rating for the subject. The profile engine 106 may also access the entire profile for the subject, beyond the information included with the risk rating. In block 504, for example, the profile engine 106 may access previous business information associated with the subject for which the subject utilized the risk rating or transaction guarantee functionality. The previous business information may include an identification of instances where the system paid compensation to another reviewer for the subject's failure to perform his or her obligations under a transaction or instances where the subject performed his or her obligations under a transaction when the transaction was guaranteed under the system.

In block 506, the profile engine 106 determines whether to guarantee the transaction based on the transaction data, the subject's risk rating, and previous business information. For example, the profile engine 106 can access statistics on subjects with similar risk ratings to determine the amount in which such subjects may not perform their obligations and then compare that amount to the amount that it is being asked to guarantee. The profile engine 106 may not guarantee transactions involving subjects with a risk rating at or below a pre-set level. If the risk rating is relatively high, or if the business information provides an indication that the subject poses a higher risk, the profile engine 106 can determine it will not guarantee the transaction and output a message to at least one of the subject and reviewer in block 507. The message can indicate that the request is denied.

If the profile engine 106 determines it can guarantee the transaction, the profile engine 106 determines the amount to offer as a guarantee in block 508. For example, the profile engine 106 may first determine the relative risk associated with a subject based on the subject's risk rating. If the risk is low to medium, the profile engine 106 determines if the subject's previous business information provides an indication that a lower risk should be associated with the subject based on the previous business information. The profile engine 106 may send a message to the subject, and optionally the reviewer, offering to guarantee the transaction upon the payment of a fee. The amount of the fee may depend on the risk rating of the subject. In some embodiments, the profile engine 106 may compare the type of transaction and the subject's obligations under the transaction with history information associated with the subject to determine the likelihood that the subject can perform the obligations. The profile engine 106 may also analyze the amount of the guarantee request and adjust the amount of any guarantee offer lower depending on the risk associated with the subject.

If the profile engine 106 determines that transaction guarantee can be offered, it sends the transaction guarantee information, including the amount, timeframe, and any other terms, to the subject, and optionally the reviewer, in block 510.

Exemplary Uses of Certain Embodiments

The following discloses examples of using risk ratings according to certain embodiments of the present invention. The examples are described with references to the screen shots shown in FIGS. 6a-11. Other embodiments may implement various aspects of the present invention using different interfaces and with different types of information.

FIGS. 6a-6b illustrate a screen shot for John Smith, a subject, to review his or her risk rating. For example, a subject can select an "Identity Report" tab on a graphical user interface dashboard to display risk rating function. Risk rating functions can include a display of the risk rating associated with the subject, other identity or "risk" indicators, and risk rating messaging through a mailbox that allows a subject to share his or her risk rating. The risk rating associated with the subject can include a credit score band, such as 300-599 shown for John Smith, that corresponds with a relative risk using stars. Credit rating factors may also be displayed. These factors can be mapped to reason codes that can be displayed to the subject to provide a reason why a particular credit score band was associated with the subject.

Other identity indicators include address locations, address usage, social security number, and office of foreign assets control (OFAC) database screening. In some embodiments, risk ratings may be a composite scoring of other subject information, such as the date on which the subject's identity was verified, age range, other known aliases, or other indicators of unscorable data due to a "thin" file.

The address location indicator can indicate a warning sign if the address for the subject is identified via access to information in a database as being an address for a non-permanent residential location such as a campground, hotel/motel, telephone answering service, prison, or mail receiving service. If so, a check mark can be associated with the address location indicator.

An address usage indicator can include a warning sign if the address was associated with fraud or misuse in the past. Social security number indicator can indicate if the social security number for the subject was reported as deceased, not issued, misused, issued prior to the date of birth, or issued within the last pre-set time period, such as five years.

An OFAC database indicator can indicate a warning sign if the OFAC database hit was returned as positive. Furthermore, the identity rating indicator can indicate whether subject's identification was verified successfully using an automatic verification process, such as eIDVerifier® by Equifax, Inc. or if the identification was verified manually, such as via a call center.

The identity report mailbox can be used by the subject to view, request, and share identity reports that include a risk rating. The mailbox illustrated in FIG. 6b shows a number of reports that have been shared with John Smith. John Smith can select a report listed in the mailbox to review it.

Figure 7:
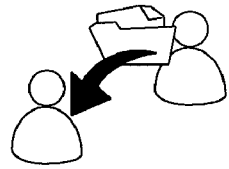
FIG. 7 is a screen shot of an identity report including a risk rating and an interface for identifying a reviewer to provide access to the risk rating according to one embodiment of the present invention.

FIG. 7 is a larger version of the mailbox shown in FIG. 6b. It includes a list of identity reports associated with John Doe that John Smith can access. In addition, John Smith can access a "Request a Report" tab that allows John Smith to transmit a message to another subject and request that the subject share his or her identity report, including a risk rating, with John Smith. John Smith can also share a report by selecting a "Share Report" hyperlink associated with a URL at which John Smith can share the report with one or more reviewers. The URL may be associated with a web page, such as a web page illustrated in FIG. 8.

Figure 9:
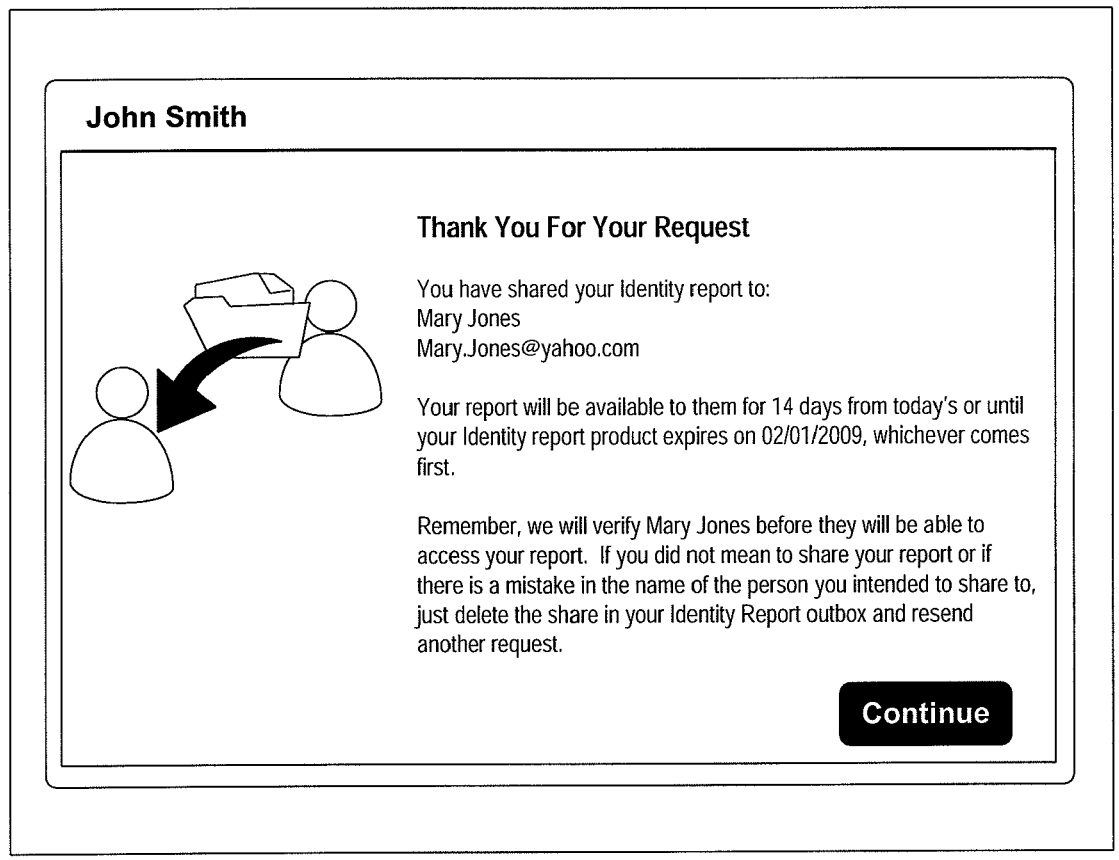
FIG. 9 is a screen shot of a confirmation that access to a risk rating has been sent to a reviewer according to one embodiment of the present invention.

Using a "Share Report" page, a subject can review an identity report that includes a risk rating and enter information of reviewers with which to share the report. For example, FIG. 8 shows an identity report for John Smith that includes a risk rating, including a credit score band and other identity indicators. The subject, John Smith can enter the name and email address of a reviewer with whom John Smith wishes to share the identity report including the risk rating. John Smith may also enter a short description of what the report is so that a reviewer can quickly associate a transaction with John Smith. When John Smith completes the information and selects the "Submit" button, access to the report can be provided to the reviewer and a confirmation is displayed to John Smith. An example of a confirmation is shown in FIG. 9. The confirmation indicates that John Smith has shared the report with reviewer Mary Jones and indicates the amount of time the report will be available to the reviewer.

The reviewer, Mary Jones, can access the report by logging on to a web page using credentials provided to her. After being authenticated, a web page is transmitted over a network by a web server to the access device, such as a computer, that Mary Jones is using. The access device can display the web page that includes the identity report of John Smith. FIG. 10 illustrates an example of an identity report provided to Mary Jones. It includes an identification of John Smith by name, his zip code, his age range, aliases, if any, other identity indicators, and a risk rating that includes the credit score band on a FICO score card in which the credit score of John Smith falls. In some embodiments, a summary of John Smith's credit history may be provided. Mary Jones can use the information to determine whether to enter into a transaction with John Smith, such as a person-to-person transaction over a network such as the Internet.

Figure 11:
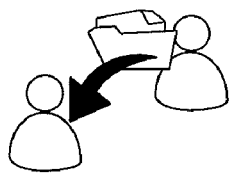
FIG. 11 is a screen shot of a mailbox in which a subject can request a risk rating from another subject according to one embodiment of the present invention.
Figure 12:
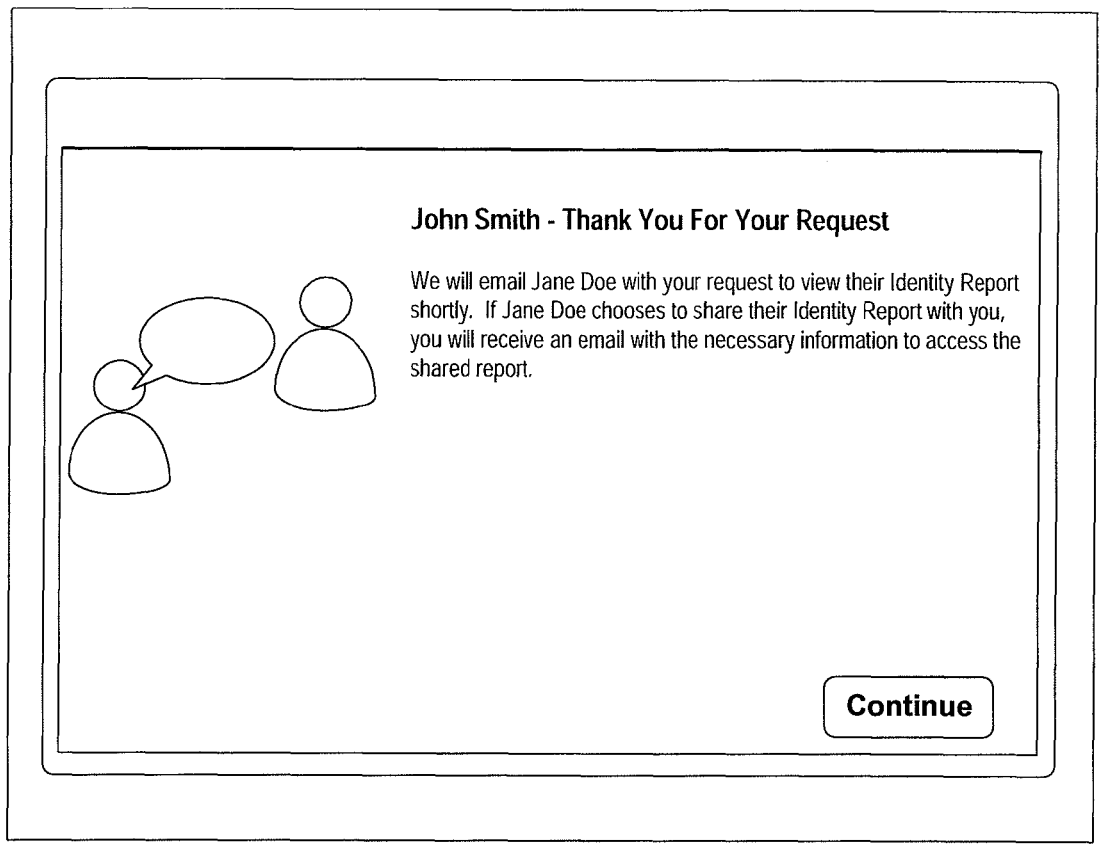
FIG. 12 is a screen shot of a confirmation that a request for risk rating has been sent to a subject according to one embodiment of the present invention.

As stated above, John Smith may also request an identity report that includes a risk rating. FIG. 11 illustrates a screen shot of a mailbox for John Smith in which he can enter a recipient's name, recipient's email address and any comments to request a report. After selecting the "Send Request" button, a request can be transmitted to the recipient and a confirmation may be displayed to John Smith, such as the confirmation shown in FIG. 12.

In some embodiments, the subject can use functions associated with the mailbox to selectively disable or enable access to the risk rating by a reviewer. The subject can select to enable access for a certain amount of time or, after providing the reviewer with access, can disable access for a selected period. For example, negotiations between the subject and reviewer may have stalled, decreasing the desire for the risk rating. After negotiations resume, the subject can enable access to the risk rating again for the reviewer using systems according to certain embodiments.

Various aspects and embodiments of the present invention can be used to exchange identity reports that include risk ratings to provide individuals with information on which they can rely to determine whether to enter into transactions with other individuals. Systems according to certain embodiments act as an agent for a subject by sharing certain personal data with reviewers after receiving permission from the subject to support transactions. Examples of transactions include the exchange of goods or services over the Internet, dating and other social arrangements, and to pre-screen individuals for potentially entering into transactions, such as a rental or real estate purchase transaction. Services provided by certain embodiments of the present invention can be implemented using a subscription service or on a shared report basis.

The foregoing description of certain aspects and embodiments of the present invention has been presented only for the purposes of illustration and description and is not intended to be exhaustive or to limit the invention to the precise forms disclosed. Numerous modifications and variations are possible in light of the above teaching. The embodiments were chosen and described in order to explain the principles of the invention and their practical application so as to enable others skilled in the art to utilize the invention and its various embodiments and with various modifications as are suited to the particular use contemplated. Alternative embodiments will become apparent to those skilled in the art to which the present invention pertains.

What is claimed is:

1. A system for determining a risk rating associated with a subject to support a person-to-person transaction, the system comprising:
  a profile device in communication with a database, the database comprising personal information and history information associated with the subject, the profile device comprising a profile engine stored on a computer-readable medium, the profile engine being configured to:
    access the personal information to authenticate the subject;
    access the history information to generate a risk rating for the subject, wherein the risk rating is generated by scoring the history information using pre-set criteria;
    output the risk rating to a reviewer identified by the subject;
    receive a transaction guarantee request for the person-to-person transaction, the request comprising transaction data;
    receive previous business information associated with prior transactions involving the subject;
    determine an amount for a transaction guarantee for the person-to-person transaction based on the transaction data, the previous business information, and the risk rating; and output a message in response to the transaction guarantee request to the reviewer identified by the subject, the message comprising an amount of the transaction guarantee; and a graphical user interface configured to receive and display the generated risk rating and the message in response to the transaction guarantee request from the profile device over a network.

2. The system of claim 1, wherein the history information comprises information of a plurality of information categories; and wherein the pre-set criteria comprises statistics for each of the plurality of information categories.

3. The system of claim 2, wherein the statistics comprise statistical averages for a population of individuals residing in a selected geographic area.

4. The system of claim 2, wherein the plurality of information categories comprises at least one of:
credit history;
credit score;
criminal history;
employment history;
income history; or
public records history.

5. The system of claim 2, wherein the pre-set criteria comprises at least one threshold for each of the plurality of information categories.

6. The system of claim 1, wherein the profile engine is further configured to:
receive access credentials from the reviewer; and
authenticate the reviewer using information from the one or more databases and the access credentials.

7. The system of claim 1, wherein the profile engine is configured to:
receive uncategorized information comprising at least one comment from an individual about the subject; and
use the uncategorized information to generate the risk rating for the subject.

8. A method for determining a risk rating associated with a subject to support a person-to-person transaction, the method comprising:
receiving, by a profile device, a request from the subject to set up a risk rating account;
receiving, by the profile device, personal information from the subject;
authenticating, by the profile device, the subject using the personal information and information received from a database;
receiving, by the profile device, history information of at least one category of history information, the history information being associated with the subject;
receiving, by the profile device, pre-set criteria for the at least one category of history information;
generating, by the profile device, the risk rating associated with the subject using the history information of the at least one category of history information and the pre-set criteria for the at least one category of history information;
outputting, by the profile device, the risk rating associated with the subject;
receiving, by the profile device, a transaction guarantee request for the person-to-person transaction, the request comprising transaction data;
receiving, by the profile device, previous business information associated with prior transactions involving the subject;

determining, by the profile device, an amount for a transaction guarantee based on the transaction data, the previous business information associated with prior transactions involving the subject, and the risk rating; and
outputting, by the profile device, a message in response to the transaction guarantee request, the message comprising an amount of the transaction guarantee.

9. The method of claim 8, further comprising:
receiving, by the profile device, a request to provide the risk rating to a reviewer;
sending, by the profile device, access credentials to the reviewer;
receiving, by the profile device, a request for the risk rating from the reviewer over a network;
authenticating, by the profile device, the reviewer; and
supplying, by the profile device, the risk rating to the reviewer in an accessible location in response to the request.

10. The method of claim 9, wherein receiving the request to provide the risk rating to the reviewer comprises:
receiving a selection of at least part of the risk rating or history information to share with the reviewer; and
wherein supplying the risk rating to the reviewer in the accessible location in response to the request comprises:
supplying the at least part of the risk rating or history information selected; and
supplying an indication for unselected portions of the risk rating or history information, the indication indicating the unselected portions of the risk rating or history information are not shared with the reviewer.

11. The method of claim 9, further comprising:
receiving an indication from the reviewer whether the risk rating caused the reviewer to enter into a transaction with the subject.

12. The method of claim 8, wherein the history information comprises history information of a plurality of categories of history information and the pre-set criteria comprises pre-set criteria for each of the plurality of categories of history information; and
wherein generating the risk rating associated with the subject comprises:
determining a score for history information of each of the plurality of categories of history information using the pre-set criteria; and
generating the risk rating based on the score for history information of each of the plurality of categories of history information.

13. The method of claim 12, wherein the pre-set criteria for each of the plurality of categories of history information comprises statistics for each of the plurality of categories of history information.

14. The method of claim 13, wherein the statistics comprise statistical averages for a population of individuals residing in a selected geographic area.

15. The method of claim 12, wherein the plurality of categories of history information comprises at least one of:
credit history;
credit score;
criminal history;
employment history;
income history; or
public records history.

16. A non-transitory computer-readable medium on which program code is stored for providing information to support a person-to-person transaction, wherein the program code causes a computer processor to:

authenticate a subject using personal information about the subject and information received from a database;

generate a risk rating for the subject based on history information associated with the subject, the history information comprising credit-related information associated with the subject, wherein the risk rating is generated by scoring the history information using pre-set criteria;

receive a request for a transaction guarantee of the person-to-person transaction between the subject and a reviewer, the request comprising transaction data identifying the subject and the reviewer and a transaction amount;

decide to issue a transaction guarantee of the person-to-person transaction and an amount to guarantee based on the risk rating, the transaction data, and previous business information associated with prior transactions involving the subject; and output the amount to guarantee to at least one of the subject or the reviewer.

17. The non-transitory computer-readable medium of claim 16, wherein the program code for generating a risk rating for a subject based on history information associated with the subject comprises program code for scoring the history information to generate a score and determining the risk rating based on the score.

18. The non-transitory computer-readable medium of claim 17, wherein the history information comprises at least one of:
credit history;
credit score;
criminal history;
employment history;
income history; or
public records history.

* * * * *